United States Patent [19]

Takeda et al.

[11] Patent Number: 5,477,450
[45] Date of Patent: Dec. 19, 1995

[54] MACHINE TRANSLATION METHOD AND APPARATUS

[75] Inventors: Koichi Takeda, Machida; Hiroshi Maruyama, Tokyo, both of Japan

[73] Assignee: International Business Machines Corporation, Armonk, N.Y.

[21] Appl. No.: 200,059

[22] Filed: Feb. 22, 1994

[30] Foreign Application Priority Data

Feb. 23, 1993 [JP] Japan .................................. 5-033223

[51] Int. Cl.⁶ .................................................. G06F 15/00
[52] U.S. Cl. ................... 364/419.02; 364/419.04; 364/419.08
[58] Field of Search .................. 364/419.02, 419.01, 364/419.04, 419.08, 200 MS File

[56] References Cited

U.S. PATENT DOCUMENTS

| 5,056,021 | 10/1991 | Ausborn .................................. 364/419 |
| 5,243,520 | 9/1993 | Jacobs et al. ......................... 364/419.08 |
| 5,265,014 | 11/1993 | Haddock et al. ................... 364/419.08 |
| 5,299,124 | 3/1994 | Fukumochi et al. ............... 364/419.02 |
| 5,321,607 | 6/1994 | Fukumochi et al. ............... 364/419.04 |

*Primary Examiner*—Gail O. Hayes
*Assistant Examiner*—Frantzy Poinvil
*Attorney, Agent, or Firm*—Ronald L. Drumheller

[57] ABSTRACT

In a machine translation method and apparatus, an input text analyzer analyzes an input text in a first language to form a graph structure of nodes and edges. An equivalent selector introduces variables to ambiguous components of the graph structure by a variable introducer. A constraint solver propagates constraints on the variables to other components. Solutions are then found for equivalent determination and locally consistent solutions are also found for the respective components. A variable realizer finds solutions to the respective locally consistent components according to the patterns of the variables. An output text generator then generates text in a second language from a set of these solutions. Thus, the method and apparatus enable avoidance of an explosion of combinations between source words and equivalents capable of occurring in the analysis phase and also enables the optimum use of information through deferring the determination of words or phrases in the second language of ambiguous components to the text generation phase.

9 Claims, 4 Drawing Sheets

MACHINE TRANSLATION METHOD AND APPARATUS

FIELD OF THE INVENTION

This invention relates to a-machine translation method and a machine translation apparatus, and more particularly, to a machine translation method and a machine translation apparatus that are used to transform a text in a first language to be translated into a translated text in a second language by means of a machine such as a computer.

BACKGROUND OF THE INVENTION

There has already been known a machine translation apparatus such that a computer is used to make a morphological analysis of a text in a first language, and transform the text into a target second language in order to bring each text into mutual correspondence of equivalent meaning between different languages (Published Unexamined Patent Application No.03-8082). The term morphological analysis here consists in analyzing an input text to discover its component words and clarifying the syntactic features of each word to be input into the next syntactic analysis phase.

This machine translation apparatus assigns a tentative modification to a component ambiguous in modification of each word isolated through morphological analysis to continue morphological analysis without suspension and translates the components thus assigned the tentative modification in the word order of the text in the final equivalent generation phase.

However, this machine translation apparatus only advances the processing of a component ambiguous in modification to the final processing phase and hence there may arise a case in which it is impossible to decide on an appropriate equivalent to the ambiguous component from among numerous alternative equivalents, in the final equivalent generation phase. Such a case is known as an explosion of ambiguity. Also, there may arise a case such that no optimal equivalent can be selected from among numerous corresponding equivalents even when a translation-is made using the order of a text.

Moreover, where a component in a first language to be translated is ambiguous in equivalent selection, syntactic analysis, and semantic analysis, what is already known is a machine translation apparatus such that ambiguity is removed by using part-of-speech information and syntactic and semantic information about a word sampled from among other components than that component of the text (in the morphological analysis phase), as in No.02-308370.

However, even in such a machine translation apparatus which removes ambiguity by using information extracted from a component other than the component in question in the text, it is necessary to sufficiently distinguish among cases of using each word according to detailed rules obtained through a thorough analysis, including a syntactic analysis and a semantic analysis, inasmuch as it is difficult to bring ambiguous components of a text into correspondence in word level to a translated text. For this reason, cases might sometimes arise where it is impossible to select the optimum equivalent from among alternatives which may be numerous depending on the degree of ambiguity.

There are further proposed methods of removing the ambiguity of word meaning, such as Word Expert (G. Adriaens and S. L. Small, Morgan Kaufmann Publishers, 1988) and Polaroid Word (G. Hirst, Cambridge University Press, 1987), which are still incapable of clearing up ambiguity in selecting equivalents or generating a translated text even when the ambiguity of word meaning can be cleared up. Also, there may arise cases where early determination of word meaning alone results in the compiler's failure to generate the optimum translated text.

There is also a proposed technique for clearing up the ambiguity of word meaning, a transformation-driven translation technique (O. Furuse, E. Sumita, and H. Ida, In Reprint of WGNL, IPSJ, vol. 80-8, November 1990), which presupposes control under which transformational knowledge based on patterns is globally applied and which hence cannot be applied to the local translation processing of texts, unlike the machine translation apparatus of this invention.

Apart from the above-mentioned methods, there is another probabilistic method such that one equivalent is selected from among a plurality of alternative equivalents by a stochastic technique and still another method using paradigms, including idioms as conventionalized turns of phrase. Although any of the above-mentioned methods using rules, probability, and paradigms can be used to obtain a translated text from a source text, it is practically impossible to make a translation with great accuracy by a single method only. Also, even when these methods are applied globally, the application sequence of texts to be applied or the sequence of applied locations might occasionally pose an obstruction to the selection of the optimum solution.

OBJECTS OF THE INVENTION

An object of this invention is to transform a source text in a first language into a translated text in a second language through the flexible selection of word meanings of words or phrases and their equivalents.

SUMMARY OF THE INVENTION

In consideration of the facts stated above, this invention has been made to provide a machine translation method and a machine translation apparatus capable of transforming a source text in a first language into a translated text in a second language through flexible selection of word meanings and equivalents so as to establish the optimum correspondence between the source text and the translated text.

In order to achieve the above-stated object, the invention provides a machine translation method of analyzing the structure of a text in a first language to be translated and transforming said text into a text in a second language comprising the steps of:

substituting ambiguous components in either semantic relation or modificatory relation or both in the structure of said analyzed text with a variable denoting said component and having constraint information, transforming another component in the structure of said analyzed text into said second language, and transforming the component substituted with said variable into said second language by using information about the other component thus transformed.

Another embodiment of the invention provides a machine translation method as set forth above, wherein the constraint information possessed by said variable is propagated to another variable or another component to transform the other component into said second language and transforming the component substituted with the variable into said second language by using either information from the other component thus transformed or the constraint information from the other variable, or both.

Another embodiment of the invention provides a machine translation apparatus comprising:

an input text analyzing means for analyzing an input text in a first language to be translated, and outputting the result of the analysis as a structure consisting of semantic information on words or phrases and more than one component with modificatory information denoting the dependency structure of the words or phrases;

a variable introducing means for denoting a component ambiguous in either said semantic information or said modificatory information or both in said structure and substituting the component with a variable denoting the component and having constraint information; a constraint disseminating means for disseminating said constraint information between related components in said structure;

a determining means for determining a set of locally consistent solutions on the basis of said constraint information propagated;

and a translated text generating means for generating and outputting a text in a second language according to said determined set of solutions.

Another embodiment of the invention provides a machine translation apparatus as set forth above, wherein said semantic information on said words or phrases is a category including a part of speech denoting the role of the words or phrases.

A further embodiment of the invention provides a machine translation apparatus as set forth above, wherein said determining means determines a set of locally consistent solutions on the basis of knowledge information including a rule for deciding on the truth or falsehood of a fact justifying said words or phrases.

A still further embodiment of the invention provides a machine translation apparatus as set forth above, wherein said structure is a graph structure that brings said words or phrases into correspondence with nodes and said modificatory information into correspondence with edges.

When a text in a first language is transformed into a text in a second language by machine translation by applying the machine translation method, the text in the first language is first analyzed for structure and then transformed into the text in the second language using the results of the analysis. Subsequently, an ambiguous component in either the semantic relations or modificatory relations, or both, in the structure of said analyzed text is substituted with a variable denoting said component and having constraint information. Hence, after substitution, the ambiguity is apparently removed from the structure of the analyzed text. Then, another component in the structure of said analyzed text, or a component other than the variable, is transformed into said second language on the basis of the semantic relations and modificatory relations. The component substituted with said variable can be transformed easily into said second language by using information about the other component transformed. Thus, each ambiguous component is substituted with a variable before being processed. Accordingly, an explosion of combinations of the first language, or source words, and the second language, or equivalents, (an explosion of ambiguity) can be avoided to a substantial extent. Thus, this invention enables a matching process of complex case structures for identifying idiomatic expressions and semantic markers as semantic classification information denoting a superordinate concept of words or phases to be used as a process of determining the ambiguity of local variables. Thereby, the determination of words or phrases in the second language corresponding to the words or phrases in the first language can be deferred until the generation of a translated text, and a text in the first language can be transformed into a text in the second language by using maximum information.

The invention also may entail the following:

constraint information possessed by a variable is propagated to another variable or another component to transform the other component into the second language. On account of the dissemination of constraint information, the meaning and modification of words or phrases of another component and also equivalents can be determined with great accuracy. The component substituted with the variable is transformed into the second language by using either information from the other component thus transformed or the constraint information from the other variable or both. Accordingly, if the relation with one ambiguous component is propagated to another component, the other component obtains constraint information from the ambiguous component, and hence there is no obstruction to the determination of equivalents. Subsequently, the ambiguity of the variable is removed by the use of the relation with the other component, whereupon the determination of equivalents of variables will proceed with great accuracy.

The above-described machine translation method can be realized by a machine translation apparatus. The machine translation apparatus analyzes an input text in a first language to be translated by input text analyzing means and outputs the result of the analysis as a structure consisting of semantic information on words or phrases and more than one component with modificatory information denoting the dependency structure of the words or phrases. As to syntactical (or grammatical) information about words or phrases, the attributes of words or phrases, as well as the meanings of words or phrases can be expressed by the use of a category including a part of speech denoting the role of words or phrases. As to structures to be output, the structures of texts can be expressed with respect to all related components by using a graph structure that brings the words or phrases into correspondence with nodes and the modificatory information into correspondence with edges. The variable introducing means substitute a component ambiguous in either semantic information or modificatory information, or both, in the structure thus analyzed with a variable denoting the component and having constraint information, the apparent ambiguities thereby being removed. The constraint disseminating means propagates constraint information between related components in the structure, in which case the actual ambiguity clear-up process regarding ambiguous components is hidden behind the variable as part of the structure. The determining means determines a set of locally consistent solutions for each component of the graph structure on the basis of the constraint information propagated. The variable is associated with a process proper to the component as typical of the determination of word meaning and equivalents. When such a set of solutions is determined, the determining means determines a set of locally consistent solutions on the basis of knowledge information, including a rule for deciding on the truth or falsehood of a fact justifying the words or phrases, and thus enables use of optimum methods, such as optimum selection of alternative words or phrases in the second language through case-base retrieval, estimation of solutions by the use of probabilistic techniques, and determination of solutions by the use of a rule base. The translated text generating means generates and outputs a text in the second language according to a determined set of solutions. As has been described so far, an explosion of ambiguity in each component can be prevented by determining a locally consistent set of solutions through disseminating constraint information, and a text in a second language can be generated easily by determining optimal solutions after removing ambiguities by the use of a set relation with other components without using any combinations of word meaning or word/phrase alternatives in the second language.

BRIEF DESCRIPTION OF SYMBOLS

10 ... machine translation apparatus
14 ... input text analyzer
20 ... equivalent selector
22 ... variable introducer
24 ... constraint solver
26 ... variable realizer
36 ... output text generator

DETAILED DESCRIPTION OF THE INVENTION

The following describes a first embodiment of this invention in reference to the relevant drawings. The first embodiment is an application of this invention to a machine translation apparatus which translates a Japanese text into English using Japanese as the first language to be translated and English as the second language into which to the Japanese is to be translated.

Figure 1:
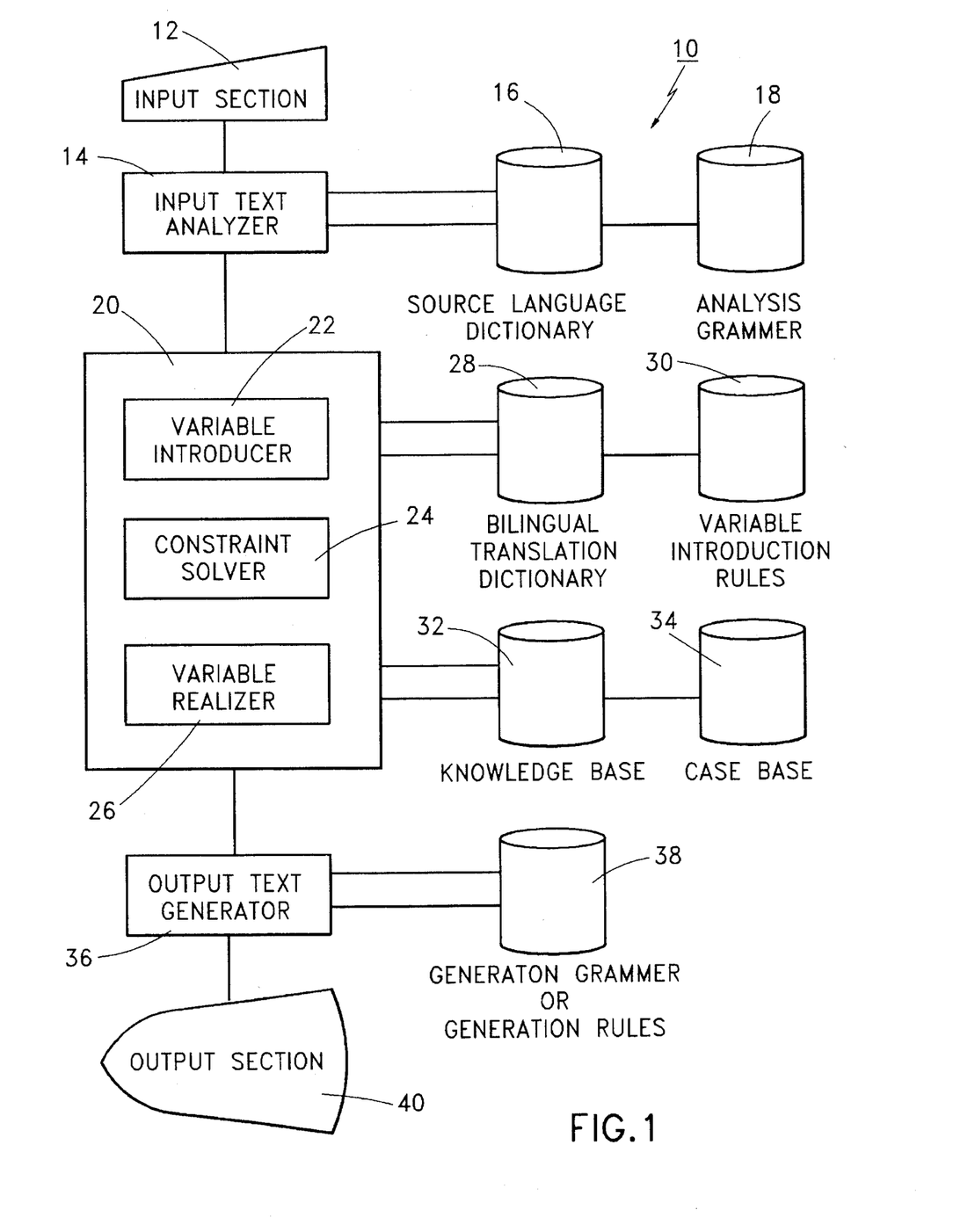
FIG. 1 is a schematic block diagram of the constitution of a machine translation apparatus as a first embodiment of this invention.

As shown in FIG. 1, the machine translation apparatus 10 of this embodiment has an input text analyzer 14, whereto a source text is input from an input section 12, such as user terminal device (a keyboard). The input text analyzer 14 is connected to a source language dictionary storage 16 storing a source language dictionary and an analysis grammar storage 18 storing an analysis grammar.

The source text to be input to the above-mentioned input text analyzer 14 is not limited to a sentence, but may also be signals representing a language output from a speech recognizer.

The input text analyzer 14 is connected to an equivalent selector 20. The translated text translated by the equivalent selector 20 is output to the output section 40 via an output text generator 36.

The equivalent selector 20 consists of a variable introducer 22, a constraint solver 24, and a variable realizer 26. The variable introducer 22 is connected to a variable introduction rule storage 30 storing variable introduction rules, which will be described in detail later, and a bilingual translation dictionary 28. Also, the variable realizer 26 is connected to a case base 34 and a knowledge base 32.

The bilingual translation dictionary 28 contains not only a store of equivalents of words or phrases, but may contain information on complex features (hereinafter called syntax) of combinations of semantic features, gender, number (singular or plural), etc., denoting the general meanings and cases of words, phrases, or texts.

The above-mentioned knowledge base 32 stores data as to the general meanings of words, phrases, or texts. For instance, knowledge concerning "fish" includes "swim" denoting a simplified action of fish and the "sea" or "water" in which they live. The knowledge base 32 also stores information (hereinafter called semantic markers) on semantic classification as a superordinate concept as to whether each word or phrase is an animate or inanimate being. For instance, the word "dog" is associated with the data "animal." This data is stored according to rules based on "if-then" logic. For the above-mentioned instance, the following rules would apply:

If it is a fish, then it can swim.

If it is a dog, then it is an animal.

The paradigm data base 34 also stores data concerning the general meanings and correspondences to corresponding equivalents of idioms as conventionalized turns of phrase. For instance, the correspondence of the Japanese idiomatic expression "... suruya inaya" to the English idiom "as soon as ..." and the correspondence of the Japanese idiomatic expression "tohgyosha" to the English idiomatic expression "a person skilled in the art" are stored as data in the paradigm data base 34.

Figure 2:
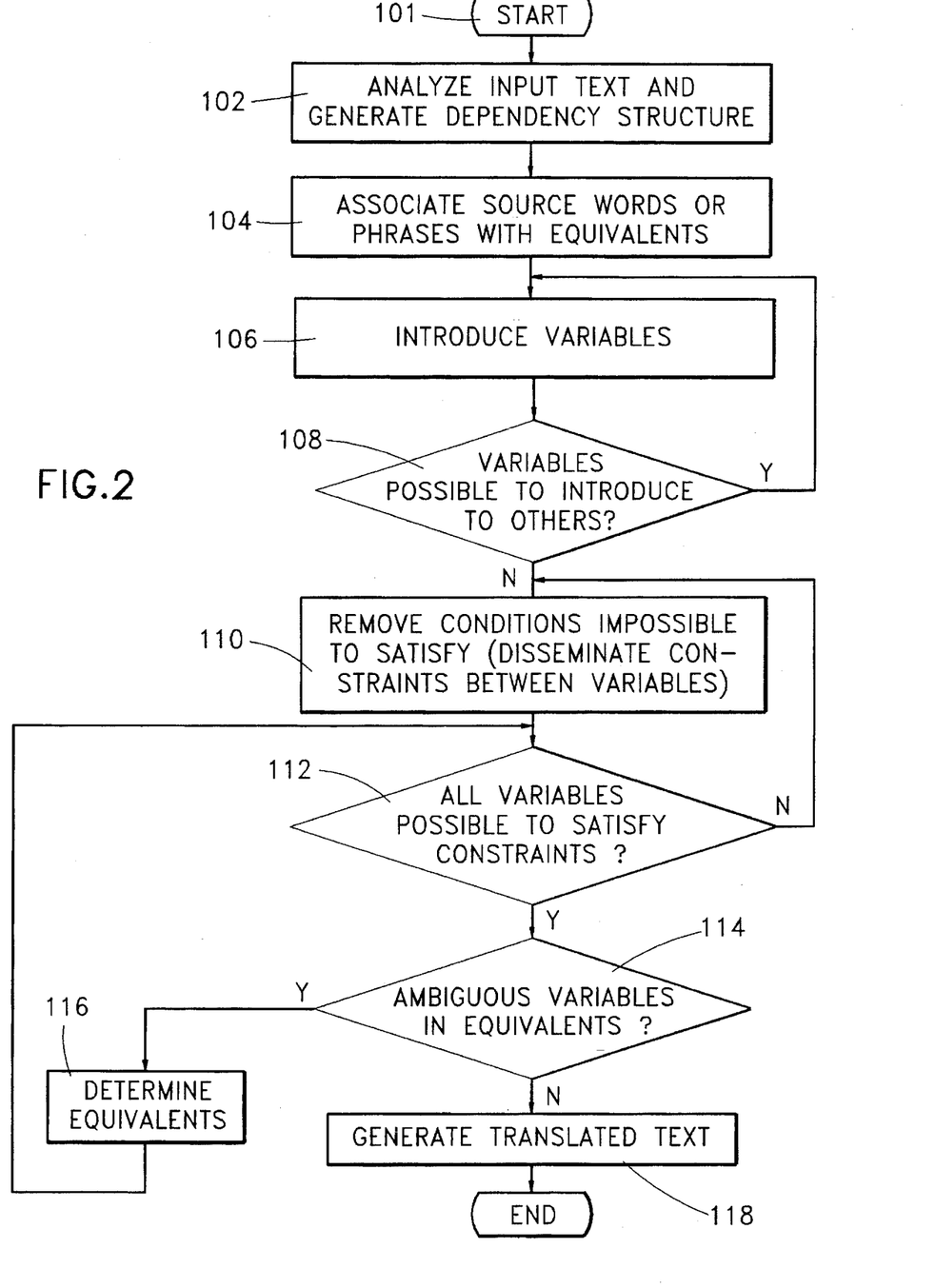
FIG. 2 is a flowchart of the translation processing flow of the above machine translation apparatus.

The following describes the operation of this embodiment. When a text to be translated entered via the input section 12 by an operator is input to the input text analyzer 14, the translation processing routine shown in FIG. 2 is executed and processing then proceeds to step 101. In the following, an example of translating the Japanese noun phrase "oto ga okii rajio" into English will be explained.

At step 102, a source text in the first language input to the input text analyzer 14 is analyzed. In the input text analyzer 14, the source text in the first language input through the input section 12 is transformed into internal information having information concerning modification, such as a dependency structure or a case structure, and the syntactic role of more than one word by reference to the source language dictionary 16 and the analysis grammar 18. The term "dependency structure" here refers to a representation of the structure of a text in terms of dependency between the main element of the text and the other constituents. The term "case structure" refers to a representation of the structure of a text by the use of a case denoting the role of constituents (case elements) for the predicate to express the meaning of the text.

Representing an analysis of the modificatory relations in the above text example with parentheses, we have:

(ラジオ(品詞名詞))

(連体修飾句(大きい(品詞形容詞)
(主格(音(品詞名詞))))

The input text analyzer 14 of this embodiment represents a structure obtained through analyzing an input text not by a tree structure wherein the main element has a one-for-many correspondence to the constituents but by a graph structure. The graph structure expresses modificatory relations, such as a dependency structures or case structures, with regard to an input text and information concerning the syntactic roles of the text, words, or phrases, more concretely by means of nodes corresponding to the words or phrases and edges representing the modificatory relations. Such a text represented by a graph structure is then output from the input text analyzer 14 to the equivalent selector 20.

Also, the input text analyzer 14 of this embodiment rests on the assumption that the ambiguity of the word meaning of each word and equivalents is not removed. The following shows a graph structure 1 generated by the input text analyzer 14 with regard to the above input text.

[Graph Structure 1]

Node 1: "rajio" (part-of-speech: noun)
Edge 1: adnominal modificatory phrase (node 1, node 2)
Node 2: okii* (part-of-speech: adjective)
Edge 2: subjective case (node 2, node 3)
Node 3: "oto"* (part-of-speech: noun)

Figure 3A:
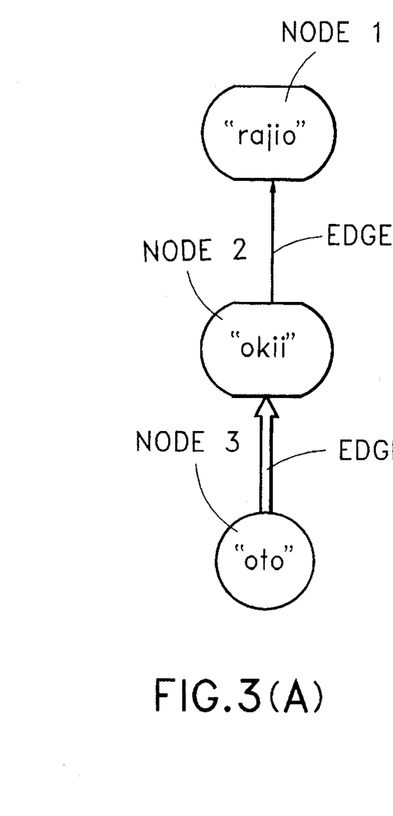
FIG. 3 is an image chart for an explanation of a variable introduction process using a graph structure generated from a source text.

In the above graph structure 1, parts of speech are written in the parentheses for the above nodes, whereas the nodes existent at both ends of each edge are written in the parentheses for each edge. FIG. 3(A) shows an image of this graph structure.

An ambiguity capable of causing more than one word meaning or modification depends on the processing performed by the input text analyzer 14 employed. In short, such ambiguities are removed in the input text analyzer 14 when a text solely according with prescribed structural and syntactic rules regarding word meaning and modification is input. If no such ambiguities are removed, the input text analyzer 14 outputs to the equivalent selector 20 a graph structure such that there are two or more edges corresponding to one node whereat no ambiguities are processed as yet.

The processing at subsequent steps 104 to 108 is carried out by the variable introducer 22 of the equivalent selector 20. At step 104, the variable introducer 28 associates each word in the source language in the graph structure with an equivalent(s) by referring to the bilingual translation dictionary 28.

The following lists bilingual translation information on the correspondence of source words referring to the bilingual translation dictionary 28 to alternative equivalents with regard to the graph structure 1.

[Bilingual translation information]

| <Source word> | <Equivalent> |
| --- | --- |
| "rajio" (part-of-speech: noun): | radio (cat n) |
| "okii" (part-of-speech: adjective): | big (cat adj), large (cat adj), loud (cat adj) |
| "oto" (part-of-speech: noun): | sound (cat n), volume (cat n), tone (cat n) |
| adnominal modificatory phrase: | with ADJ SUBJ (cat prep), whose SUBJ be ADJ (cat rel) | where the alphabetic strings in parentheses following the equivalents denote the following:
cat: category
n: noun
adj: adjective
prep: preposition
rel: relative (particularly relative pronoun)

Also, the equivalents of the above adnominal modificatory phrase reveal that the modificatory phrase in question is an English adjective and has its subjective case. The symbols SUBJ and ADJ specify the position of an equivalent in its subjective case and the position of an adjectival equivalent, respectively.

For the above text example, "okii" and "oto" suffixed with the symbol * (see graph structure 1.) are each associated with more than one word meaning or equivalent and hence produce ambiguity, but there is little ambiguity about the modificatory relations of the given graph structure.

At the next step 106, variables are introduced into the input graph structure, whereby the graph structure is transformed according to a structural change due to the introduction of these variables. In short, the variable introducer 22 first scans the nodes of the input graph structure in any sequence and determines the node which accords with prescribed variable introduction rules. When two or more rules can be applied to one node, a disjunction (union) of these determined variables is calculated to introduce one variable to each node. Variables are thus introduced sequentially to the respective nodes (step 108). Accordingly, the variables thus introduced assume some ambiguity about either the meaning of words or phrases (word meaning) or modificatory relations, or both.

These variable introduction rules define variable insertion locations for the input text using a graph structure. One variable introduction rule consists of (1) designation of a node as the root of a partial structure of the graph structure, or designation of a predicate, etc, whose truth or falsehood can be calculated from a given noun, a negated phrase, and information assigned to the node within a practical length of time, (2) designation of a subsequent or superordinate node which can be reached from a designated node, and (3) definition of a variable to be introduced. When the equivalent selector 20 receives from the input text analyzer 14 a text whose word meaning or modificatory relations are still partly ambiguous, the variable introduction rule for the determination of word meaning and the variable introduction rule for the determination of modificatory relations are both applied to the text.

Figure 4:
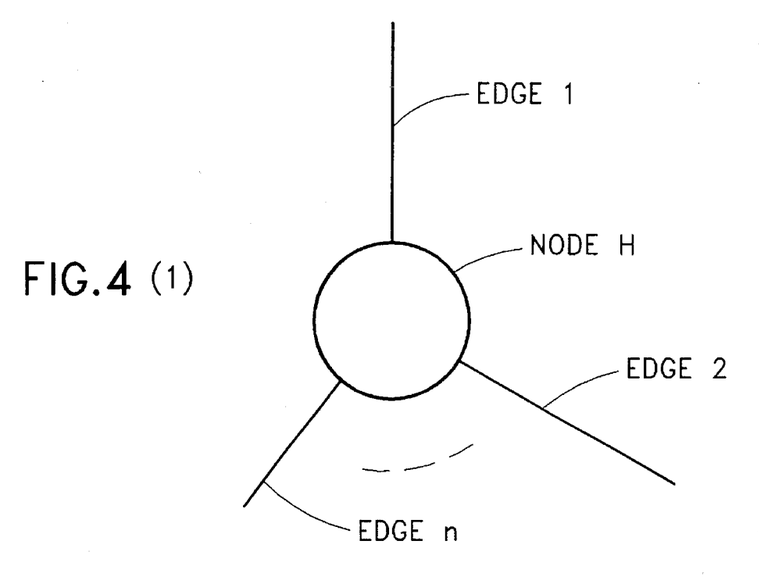
FIG. 4 is an image chart for an explanation of the process of introducing one variable into a component to be the root; of a graph structure.

A variable is defined by a reference item, a modificatory phrase attached to the reference item, and a proper reference procedure. The reference item is a word or phrase (hereinafter called a syntax; a node in FIG. 4) denoting the key concept of a partial structure of the input graph structure, which is associated with its corresponding value. The modificatory phrase attached to the reference item modifies a variable with a relationship quite similar to the modificatory relationship to the syntax and is represented by a edge (FIG. 4). The proper reference procedure is a conceptually simplified processing pattern of word meaning determination or equivalent determination, or a word meaning/equivalent selection pattern, which is associated with its corresponding value. In other words, the proper reference procedure is a function for calculating a new processing pattern (or a graph structure) including no original processing pattern according constraint information obtained from a reference item, a modificatory phrase, and a superordinate or subordinate partial structure. Such calculation includes the determination of a solution through the conventional probabilistic estimation of equivalents and the retrieval of paradigms.

The procedure for introducing variables consists in substituting node h with node v representing a variable, substituting all edges extending from node h with edges extending from node v, and finally adding edges of reference from node v to node h on a partial structure (FIG. 4(1)) rooted at input node h, as shown in FIG. 4(2).

Variables propagate constraint information concerning a superordinate partial structure of the input graph structure and its related reference item and modificatory phrase. The constraint information may be whatever conjunction (a value representing two or more pieces of constraint information in sequence) of predicates capable of being practically operated on (ones capable of being determined by a linear or polynomial time), such as a designated value to be taken by a particular item or a condition as to whether or not there is a modificatory phrase. A graph structure which does not accord with such constraint information is regarded as not well-formed, so that the variables are not introduced because they are inconsistent with the proper reference procedure associated with the variables. If a variable can take two or more word meanings or equivalent patterns, the variable is expressed by a disjunction of conjunctions of two or more pieces of constraint information.

The following shows variable introduction rules applicable to the above text example:

[Variable Introduction Rules]

Ambiguity about word meanings and equivalent:
  LookupCaseBase (Self)
  most-frequent (Self) if failed
Syntax of adnominal modificatory phrase:
  part-of (Self→Subj, Sup) & anim (Sup)
    →("whose" pattern)
  has-property (Sup, Self→Subj)
    →("with" pattern)
  Other than the above conditions ("with" pattern)

Figures 3B, 3C, 3D:
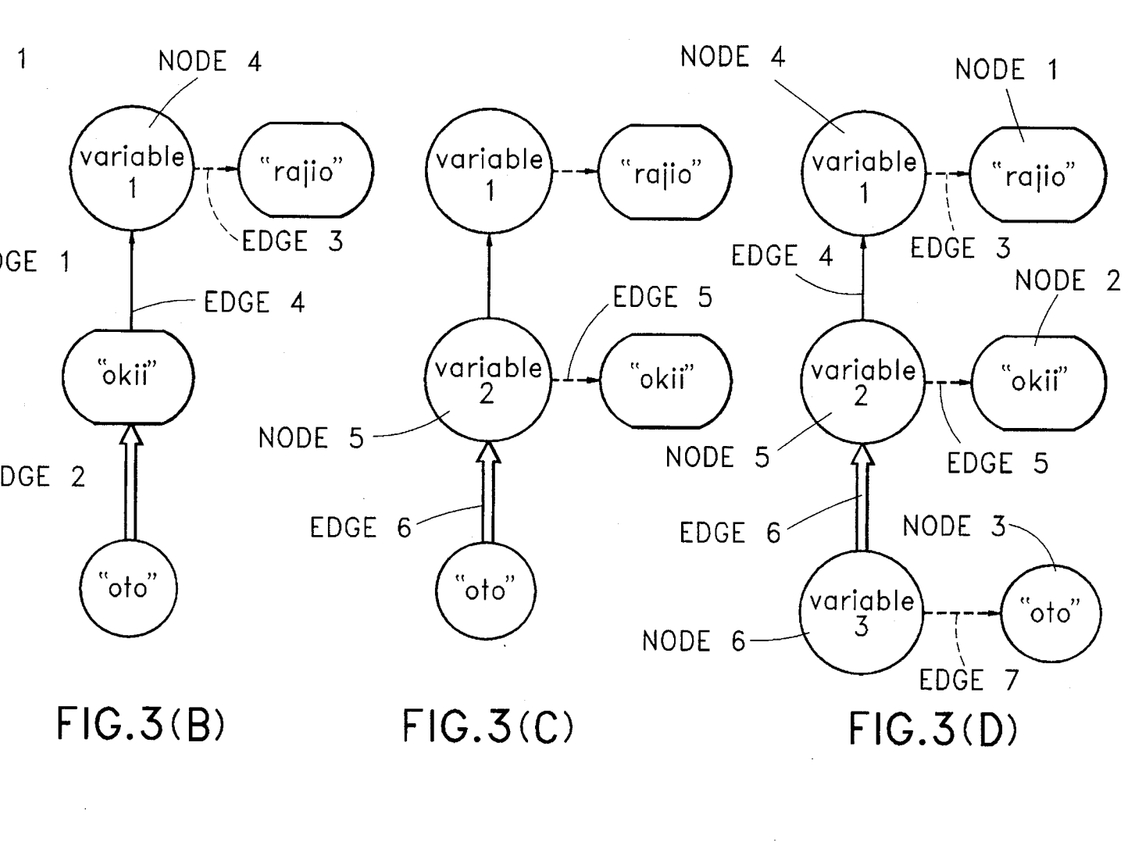

These rules first provide the designation of a node to which to introduce and then provide a reference procedure proper to the variable. As regards ambiguity about word meaning and equivalents, "LookupCaseBase (Self)" instructs the selection of alternatives from among given case bases on the basis of the word meaning of "Self" and the word meaning of its superordinate phrase or modificatory phrase, and instructs the selection of "most-frequent (Self)," that is, the word meaning which most frequently occurs singly when the selection of alternatives has failed. In the syntax of modificatory phrases, "part-of (Self→Subj, Sup)" requires its own subjective case filler Subj to stand in a part-whole relation with Sup; "anim (Sup)" requires Sup to be an animate being; and "has-property (Sup, Sup→Subj)" requires its own subjective case filler Subj to be one of the properties or features of Sup. In graph structure 1 in the above text example, such variable introduction rules are applied to nodes 1 to 3 a total of three times. In other words, variable 1 for node 4 with edges 3 and 4 is introduced by applying the variable introduction rules to node 1, as shown in FIG. 3(B); variable 2 for node 5 with edges 5 and 6 is introduced by applying the variable introduction rules to node 2, as shown in FIG. 3(C); variable 3 for node 6 with edge 7 by applying the variable introduction rules to node 3, as shown in FIG. 3(D). Thus, graph structure 1 is transformed into graph structure 2 below:

[Graph Structure 2]

Node 4: variable 1
Edge 3: reference (node 4, node 1)
Node 1: "rajio" (part-of-speech: noun)
Edge 4: adnominal modificatory phrase (node 4, node 5)
Node 5: variable 2
Edge 5: reference (node 5, node 2)
Node 2: "okii"* (part-of-speech: adjective)
Edge 6: subjective case (node 5, node 6)
Node 6: variable 3
Edge 7: reference (node 6, node 3)
Node 3: "oto"* (part-of-speech: noun)

FIG. 3(D) shows an image of graph structure 2.

As soon as the nodes to which to introduce variables are exhausted, processing proceeds to step 110. At step 110, which corresponds to the process of the constraint solver 24 of the equivalent selector 20, the constraint solver 24 checks constraint information for consistency between contiguous variables and excludes those incapable of being solutions from the patterns to which the variable conforms. Then, such checks on constraint information for dissemination and consistency are repeated until all patterns meet the local constraint information requirements (step 112).

When the equivalent selector 20 has the knowledge "has-property (radio, volume)" as a knowledge base and the concurrence relations "(volume, loud), (tone, loud), (sound, big), and (radio, big) are stored in the case base 34, the constraint solver 24 removes the equivalent "large" which occurs together with none of the equivalents of "rajio" and "oto" as a case from among probable equivalents of variable 2, and then propagates any change in constraint information due to this alteration. In this case, no new change occurs in constraint information on the other variables and thus a locally consistent graph structure is obtained. In this case, it is not possible to further narrow down alternatives of equivalents.

When a locally consistent graph structure is thus obtained, the variable realizer 26 of the equivalent selector 20 determines one equivalent of each variable according to constraint information about locally consistent variables, word meanings, and equivalents (steps 114 to 116).

The process in this variable realizer 26 is to first select one pattern from among given patterns of constraint information about locally consistent variables, word meanings, and equivalents with a criterion based on the pattern determination information below:

[Pattern Determination Information]

(1) Knowledge information about the truth/falsehood of an equivalent corresponding to the position of a word in a graph structure
(2) Probabilistic information about the frequency of occurrence of an equivalent of a word
(3) Case base information provided for idiomatic expressions Once the above pattern is selected, a solution can be calculated by executing the reference procedure proper to the variable concerned. The determination of a pattern is carried out according to the knowledge information, probabilistic information, case base information, and their priorities. For instance, if higher priority is given to idiomatic phrase patterns, idiomatic phrases can be so designed as to take priority over literal interpretations. The global generation of a translated text may fail even if a solution is successfully found, in which case the subsequent alternatives are sequentially operated by repeatedly applying a back track method until a translated text is generated successfully.

The back track method as referred to here consists in dividing a problem incapable of being solved directly into two or more subproblems to which solutions are sought, sending found solutions sequentially to the superordinate problem, and resending other solutions sequentially to the superordinate problem if such sent solutions fail to solve the superordinate problem.

The variable realizer 26 in the case of the above text example employs a method of giving higher priority to a variable such that the word meanings and equivalents of the contiguous phrase are likely to contribute to the realization of the variable determining an equivalent of the noun phrase. This method may be changed according to the type of the variable. Accordingly, the word "radio" for variable 1 is not ambiguous as an equivalent. Hence, if the translation pattern of the adnominal modificatory phrase is evaluated on the bases of this equivalent, the first condition is not satisfied because "radio" is an inanimate being, but the second condition is satisfied when the equivalent of variable is "volume." Thereupon, "volume" is selected preferentially as the equivalent of variable 3, and this change is propagated. Moreover, "loud" as the sole word occurring together with "volume" remains as the equivalent of variable 2. Thus, the sequential realization of "radio (cat n)," "with (cat prep)," "volume (cat n)," and "loud (cat adj)" takes place, whereupon a graph structure having ambiguity-removed equivalents and translation patterns is sent to the output text generator 36.

Once variables with ambiguity about alternative equivalents are exhausted, processing proceeds to step 118, whereat the output text generator 36 generates translated text 1 in the second language shown below on the basis of the given equivalents, and then this routine terminates.

[Translated Text 1]

Radio With Loud Volume

Thus, this embodiment removes apparent ambiguities by substituting a variable for a partial structure with ambiguities concerning word meaning and equivalent selection encountered in the analysis of a source text, associating the variable thus substituted with its proper reference procedure, putting constraints on the possible conditions of each variable by propagating constraint information possessed by the variable to the superordinate and subordinate components of a graph structure, preventing an explosion of ambiguity in each partial structure through reference to probabilistic information and case base information accumulated in a knowledge base, determining a locally consistent set of solutions, and then determining a correspondence to optimum equivalents. Hence, this embodiment enables ambiguities appearing in the initial analysis phase, including syntactic analysis and semantic analysis, liable to set off an explosion of ambiguity to be deferred to a later translated text generation process allowing flexible and extensive equivalent selection through the introduction of variables and thus enables use of maximum information in selecting equivalents. Hence, the translated text thus generated is high in accuracy of correspondence to the source text.

Then, the case base 34 stores "oto ga okii"=noisy (cat adj) as a idiomatic phrase including "okii," and variable 2 gives priority to noisy (cat adj) if the pattern of a translation of noun N-adnominal modificatory phrase-single adjective ADJ is preset to ADJ N, whereby variable 3 is erased and translated text 2 shown below is generated.

[Translated Text 2]

Noisy Radio

The optimal feature of a translated text generated increases with the amount of data holding paradigms such as idiomatic phrases.

The following explains how ambiguities concerning a compound noun formed of two or more words are removed. For instance, when an equivalent is generated for such a compound noun phrase structure as "high performance option," it is necessary to discriminate "high+ performance option" from "high performance+option" unless this structure has been registered as a single word. However, an exponential ambiguities must be taken into consideration if such possible combinations are all calculated in the syntactic analysis of such a compound noun phrase, which is apparently neither realistic nor practical. In this embodiment, by contrast, it is possible to obtain the correct solution, "high-performance+option," without any explosion of ambiguity, by giving higher priority to a set of words (word meanings) of closer contiguity through introducing variables to the nodes of one right edge structure, i.e., (high (performance (option))).

Thus, even if no words or phrases, such as compound nouns, have been registered beforehand, the optimum equivalent of a compound noun as a partial structure can be generated by introducing a variable introduction process, as in this embodiment.

The following describes a second embodiment (embodiment 2). Embodiment 2 is an example of translating English as the first language into French as the second language. Embodiment 2 is on an extension of the explanation of embodiment 1 given for the removal of ambiguities concerning the modificatory relations of compound nouns in English. Hence, a detailed explanation of parts overlapping those of embodiment 1 will be omitted here. The following explains a result of transformation by example.

[Source Text]

An explanation will be provided below concerning how the following noun phrase in English is translated into French by embodiment 2:
"The choices and the updates made"

When the word "made" in the source text modifies "update" alone, translated text 3 below will be generated:

[French Text 1]

[Translated Text 3]

Les choix et les mise à jour faites

Thus, the equivalent "faites" is generated.

When the word "made" modifies both the word "change" and the word "update," translated text 4 below will be generated:

[French Text 2]

[Translated Text 4]

Les choix et les mise á jour faits

Thus, the equivalent "faits" is generated.

In the above, there is a strong possibility that there are numerous equivalents to the word "make" even though there is no ambiguity about equivalents of the noun "choice" and the word "update," whereupon if an attempt is made to determine modificatory relations and equivalents in sequence by ordinary translation methods, equivalents of the different word "make" will be assigned to the noun "choice" and the word "update" resulting in the possibility of translation error. By contrast, this embodiment is able to generate the correct translated text, i.e., translated text 5, by using case base information concerning the concurrence of "choix" and "faire," and the occurrence together of "faire" and

[French Text 3]

mise á jour in object language with the equivalent selector 20.

[French Text 4]

[Translated Text 5]

Les choix et les mise á jour faits

Thus, this embodiment enables a source text in any language to be translated into an optimal translated text even in the case of some ambiguity being caused, through performing a variable introduction process similar to embodiment 1, which entails undergoing a transformation requiring a procedure for the determination of word meanings, modificatory relations, and equivalents.

According to the invention described above, the determination of the parts of speech of a second language corresponding to each part of speech of a first language can be delayed up until just before speech development for the second language, without the occurrence of explosions of ambiguity at the beginning of syntactic and semantic analysis through the introduction of variables, and it is also possible to make optimum use of information so as to carry out proper switching. Moreover, because as constraint information about components substituted with variables is propagated to other variables or other components, information exerting influence from an apparently ambiguity-removed component on another component can be utilized, so that the determination of words or phrases in a second language of each component can be effected with great accuracy.

We claim:

1. A machine translation method of analyzing the structure of a text in a first language to be translated and transforming said text into a text in a second language comprising the steps of:

substituting an ambiguous component in either a semantic or modificatory sense, or both, in the structure of said analyzed text with a variable denoting said ambiguous component and having constraint information;

transforming another component in the structure of said analyzed text into said second language using a bilingual translation dictionary to uncover information about said another component; and transforming the component substituted with said variable into said second language by using said uncovered information about said another component to resolve said ambiguous component.

2. A machine translation method, as set forth in claim 1, wherein the constraint information possessed by said variable is propagated to another variable or another component to transform said another component into said second language and transforming the component substituted with the variable into said second language by using either information from said another component thus tranformed or the constraint information from said another variable or both.

3. A machine translation apparatus comprising:

an input text analyzing means for analyzing an input text in a first language to be translated and outputting the result of the analysis as a structure consisting of semantic information on words or phrases and more than one component with modificatory information denoting the dependency structure of the words or phrases;

a variable introducing means for denoting a component ambiguous in either said semantic information or said modificatory information, or both, in said structure and substituting the component with a variable denoting the component and having constraint information;

a constraint disseminating means for disseminating said constraint information between related components in said structure;

a determining means for determining a set of locally consistent solutions on the basis of said disseminated constraint information; and a translated text generating means for generating and outputting a text in a second language according to said determined set of solutions.

4. A machine translation apparatus, as set forth in claim 3, wherein said semantic information on said words or phrases is a category including a part of speech denoting the role of the words or phrases.

5. A machine translation apparatus, as set forth in claim 3, wherein said determining means comprises means for determining said set of locally consistent solutions on the basis of knowledge information including a rule for deciding on the truth or falsehood of a fact justifying said words or phrases.

6. A machine translation apparatus, as set forth in claim 4, wherein said determining means comprises means for determining said set of locally consistent solutions on the basis of knowledge information including a rule for deciding on the truth or falsehood of a fact justifying said words or phrases.

7. A machine translation apparatus, as set forth in claim 3, wherein said structure is a graph structure that brings said words or phrases into correspondence to nodes and said modificatory information into correspondence to edges.

8. A machine translation apparatus, as set forth in claim 4, wherein said structure is a graph structure that brings said words or phrases into correspondence to nodes and said modificatory information into correspondence to edges.

9. A machine translation apparatus, as set forth in claim 5, wherein said structure is a graph structure that brings said words or phrases into correspondence to nodes and said modificatory information into correspondence to edges.

* * * * *